US010955075B2

(12) United States Patent
Nelsen et al.

(10) Patent No.: US 10,955,075 B2
(45) Date of Patent: Mar. 23, 2021

(54) HAMMERLESS PIPE UNION (71) Applicant: Nelsen Technologies Inc., Sherwood Park (CA)

(72) Inventors: Blair Nelsen, Sherwood Park (CA); James Chisholm, Camrose (CA); Cody Gunderson, Sherwood Park (CA)

(73) Assignee: Nelsen Technologies Inc., Leduc (CA)

( * ) Notice: Subject to any disclaimer, the term of this patent is extended or adjusted under 35 U.S.C. 154(b) by 173 days.

(21) Appl. No.: 15/854,591

(22) Filed: Dec. 26, 2017

(65) Prior Publication Data
US 2018/0187804 A1 Jul. 5, 2018

Related U.S. Application Data

(60) Provisional application No. 62/440,768, filed on Dec. 30, 2016.

(51) Int. Cl.
*F16L 15/08* (2006.01)
*B25G 1/10* (2006.01)
*F16L 19/025* (2006.01)
*F16L 17/06* (2006.01)

(52) U.S. Cl.
CPC .............. *F16L 15/08* (2013.01); *B25G 1/105* (2013.01); *F16L 17/06* (2013.01); *F16L 19/025* (2013.01)

(58) Field of Classification Search
CPC ....... F16L 15/08; F16L 15/00; F16L 19/0206; F16L 19/02; F16L 19/025
USPC .......................................... 285/39, 388, 387
See application file for complete search history.

(56) References Cited

U.S. PATENT DOCUMENTS

| 464,084 A | 12/1891 | Robinson |
| 1,528,892 A | 3/1925 | Pigott et al. |
| 1,604,211 A * | 10/1926 | Williams ................ F16L 37/10 285/27 |
| 2,376,058 A * | 5/1945 | Jeffreys ................. F16L 15/001 285/116 |
| 2,417,025 A | 3/1947 | Volpin |
| 2,691,912 A | 10/1954 | Jones |
| 2,830,480 A | 4/1958 | Brame |
| 4,697,830 A | 10/1987 | Wood et al. |

(Continued)

FOREIGN PATENT DOCUMENTS

| JP | 09049592 | 2/1997 |
| JP | 2010169166 | 8/2010 |
| JP | 4773154 | 9/2011 |

*Primary Examiner* — Aaron M Dunwoody
(74) *Attorney, Agent, or Firm* — Klarquist Sparkman, LLP (57) ABSTRACT

A device for forming a union of pipe ends includes two pipe connectors, each configured for attachment to an end of a length of pipe at one end and for joining to the other of the two connectors at the other end and a nut having a bore with internal threads configured to mate with outer threads on the outer surface of one or both of the two pipe connectors. The outer lateral surface of the nut includes a plurality of handle connection structures. The device includes a handle for increasing the amount of manually-generated torque on the nut during tightening or loosening of the nut with respect to the outer threads. The handle has a nut attachment end configured to engage the handle connection structures, and is provided with a mechanism for reversibly locking the handle to any of the plurality of handle connection structures of the nut.

24 Claims, 5 Drawing Sheets

(56) References Cited

U.S. PATENT DOCUMENTS

| | | | |
|---|---|---|---|
| 5,082,391 A * | 1/1992 | Florida | F16B 7/0426 |
| | | | 285/184 |
| 8,118,528 B2 | 2/2012 | Herndon | |
| 8,657,547 B2 | 2/2014 | Herndon | |
| 8,683,848 B1 | 4/2014 | Taft et al. | |
| 2008/0136168 A1* | 6/2008 | Ungchusri | B25B 19/00 |
| | | | 285/39 |
| 2012/0048069 A1 | 3/2012 | Powell | |
| 2014/0374122 A1* | 12/2014 | Fanguy | E21B 17/043 |
| | | | 166/380 |
| 2015/0226355 A1 | 8/2015 | Ungchusri et al. | |
| 2017/0167644 A1* | 6/2017 | Broussard, Jr. | F16L 19/025 |
| 2017/0304999 A1* | 10/2017 | Broussard, Jr. | B25B 23/0028 |
| 2017/0363232 A1* | 12/2017 | Varnado | F16L 19/0225 |
| 2018/0163904 A1* | 6/2018 | Nguyen | F16L 19/0218 |
| 2018/0356015 A1* | 12/2018 | Jahnke | B25B 13/5091 |

* cited by examiner

HAMMERLESS PIPE UNION

CROSS-REFERENCE TO RELATED APPLICATIONS

This application claims the benefit of U.S. Provisional Application No. 62/440,768 filed Dec. 30, 2016, which is incorporated by reference herein in its entirety.

FIELD OF THE INVENTION

The disclosed technology relates to the field of pipe couplings and more particularly to couplings used for pipes employed in petroleum recovery systems and mining.

BACKGROUND

Hammer unions are well known couplings used in the oil, gas and mining industries for fastening pipe together. For example, pipe carrying high-pressure fluids such as drilling mud, fracturing fluids and oil and gas produced in drilling activities may be coupled using hammer unions. Hammer unions generally comprise an annular metal body having a thread end and a nut end with one or more lugs or wing nuts extending outwardly from the annular body which can be struck with a hammer to rotate the hammer union in order to tighten or loosen it.

U.S. Patent Publication No. US 2012/0048069, incorporated herein by reference in its entirety, describes a hammer union wrench comprising a tool head having a substantially circular or disk shaped tool head body with an opening there through axially and transversally. The axial opening also includes slots which receive tabs associated with the hammer union. Although this is a useful arrangement, it requires the engagement of at least two of the tabs or bosses of the hammer union and fairly specific alignment of the tool head relative to the hammer union.

Other tools used with hammer unions are spanner wrenches. An example of one such arrangement is shown in U.S. Pat. No. 2,830,480, incorporated herein by reference in its entirety. This wrench has a semicircular tool head with a series of recesses and projections positioned on the tool head. The recesses and projections mate in registration with similarly configured recesses and projections in the tubing union.

U.S. Pat. No. 464,084, incorporated herein by reference in its entirety, describes a curved jaw tool head with a tooth positioned within the jaw and guiding ears associated therewith.

U.S. Pat. No. 2,691,912 incorporated herein by reference in its entirety, describes an anvil type wrench. The wrench effectively comprises a body suitable for use in pipe union fittings.

U.S. Pat. No. 1,528,892, incorporated herein by reference in its entirety, describes a wrench which has an internally-directed U-shaped head.

Japan Patent document JP 477315462, incorporated herein by reference in its entirety, describes a pipe fitting with a cam lever for locking pipes together.

Japan Patent document JP 09049592A, incorporated herein by reference in its entirety, describes a pipe joint with a handle-operated nut coupler.

Japan Patent document JP 2010169166A, incorporated herein by reference in its entirety, describes a bite type pipe connection structure with a cam surface to which a distal end of a ferrule is pressed is provided on a joint body.

U.S. Pat. No. 2,417,025, incorporated herein by reference in its entirety, describes a hammer lock union which is locked in place using a lateral pin.

U.S. Pat. No. 4,697,830, incorporated herein by reference in its entirety, describes a guide system for protecting threads and seals when joining lengths of production tubing. The system includes removable handles secured by large bolts.

U.S. Pat. Nos. 8,118,528, and 8,657,547, each of which is incorporated herein by reference in its entirety, each describe variations of a field replaceable hammer union wing nut with removable hammer pads.

U.S. Patent Publication No. 2015/0226355, incorporated herein by reference in its entirety, describes a hammer union connector which includes male and female pipe connectors, a threaded nut and load segments for insertion between the nut and the male sub.

There continues to be a need for improving pipe union systems for use in the oil, gas and mining industries for fastening pipes together.

SUMMARY

In one aspect, there is provided a device for forming a union of pipe ends, the device comprising: a) two pipe connectors, each configured for attachment to an end of a length of pipe at one end and each configured for joining to the other of the two connectors at the other end; b) a nut having a bore with internal threads configured to mate with outer threads on the outer surface of one or both of the two pipe connectors, the outer lateral surface of the nut having a plurality of handle connection structures; and c) a handle for increasing the amount of manually-generated torque on the nut during tightening or loosening of the nut with respect to the outer threads, the handle having a nut attachment end configured to engage the handle connection structures, the handle further provided with a mechanism for reversibly locking the handle to any one of the plurality of handle connection structures of the nut.

In some embodiments, the two pipe connectors are a female connector and a male connector.

In some embodiments, the outer threads are present only on the female connector and the male connector includes an outer abutment which cooperates with a ridge in the bore of the nut to stop the threading of the inner threads onto the outer threads.

In some embodiments, the handle connection structures are defined as sockets formed in the outer lateral surface of the nut, the sockets configured to receive the nut attachment end of the handle.

In some embodiments, the handle connection structures are defined as protrusions formed in or attached to the outer lateral surface of the nut, the protrusions configured to be received by sockets formed in the nut attachment end of the handle.

In some embodiments, the mechanism for connecting and reversibly locking the handle to each one of the plurality of handle connection structures of the nut is provided by a retaining pin configured to pass through aligned openings in the nut and in the nut attachment end of the handle.

In some embodiments, the device further comprises a hammer pad having a nut attachment end configured a mechanism for connecting and reversibly locking the hammer pad to each one of the plurality of handle connection structures of the nut, the hammer pad provided to present a flat laterally extending surface for striking with a hammer to increase the amount of manually-generated torque on the nut during tightening or loosening of the nut with respect to the outer threads.

In some embodiments, the mechanism for connecting and reversibly locking the hammer pad to each one of the plurality of handle connection structures of the nut is provided by a retaining pin configured to pass through aligned openings in the nut and in the nut attachment end of the hammer pad.

In some embodiments, the plurality of handle connection structures is six equi-spaced handle connection structures.

Another aspect of the disclosed technology is a kit for forming a union of two pipe ends. The kit includes the device as described herein in combination with instructions for forming a union of two pipes using the device.

BRIEF DESCRIPTION OF THE DRAWINGS

Various objects, features and advantages of the disclosed technology will be apparent from the following description of particular embodiments, as illustrated in the accompanying drawings. The drawings are not necessarily to scale. Emphasis is instead placed upon illustrating the principles of various embodiments of the technology.

DETAILED DESCRIPTION

Rationale

Over time, repetitively striking the wing nuts on a hammer union damages the wing nuts, causing them to wear down and become misshapen. This causes the wing nuts more difficult to strike accurately with a hammer. If the wing nuts become too damaged, the entire hammer union must be replaced. Replacing a hammer union is generally costly and time consuming because the pipe must be cut apart and re-welded. This is generally becoming more of a problem as more expensive pipes are increasingly being used in drilling mud systems in oil and gas wells to accommodate higher pressures. The inventors are engaged in efforts to improve union devices for joining pipes and have developed the technology which is described hereinbelow in context of an example embodiment.

Various aspects of the disclosed technology will now be described with reference to the figures. For the purposes of illustration, components depicted in the figures are not necessarily drawn to scale. Instead, emphasis is placed on highlighting the various contributions of the components to the functionality of various aspects of the disclosed technology. A number of possible alternative features are introduced during the course of this description. It is to be understood that, according to the knowledge and judgment of persons skilled in the art, such alternative features may be substituted in various combinations to arrive at different embodiments of the disclosed technology.

FIGS. 1 to 5 illustrate one embodiment of a hammerless union device for joining ends of two pipes P-1 and P-2. In this embodiment, the end of pipe P-1 is provided with a female connector 12 and pipe P-2 is provided with a male connector 14 which is configured to mate with the female connector 12 to make a pipe connection. The connection is tightened using an internally threaded union nut 16 which is threaded onto external threads 20 on the outer sidewall of the female connector 12. In some embodiments, the connectors 12 and 14 are fixed to the pipe ends by welding. In other embodiments, the connectors 12 and 14 have rearward threads which are configured for threading attachment to threaded pipes.

Once the female 12 and male 14 connectors are mated, a union nut 16 is placed over the two mated connectors to fix them in place. For greater clarity and with respect to the example embodiment, during installation of the hammerless union device on a pair of pipes P-1 and P-2, the nut 16 is installed on pipe P-2 prior to connection (e.g. by welding) of the male connector 14 to the pipe P-2 because the interior sidewall of the bore of the nut 16 is provided with a circumferential ridge 32 which provides a reduced diameter bore acting as a stop when it encounters a circumferential abutment 34 formed in the outer sidewall of the male connector 14. This arrangement prevents the nut 16 from moving past the male connector 14. In this particular embodiment, the nut 16 has a central bore which has a majority portion with a threaded interior sidewall 26 (best illustrated in FIGS. 1, 3 and 5). The threaded interior sidewall 26 is configured to thread onto outer threaded surface 20 of the female connector 12. In certain embodiments, such as the one illustrated in FIG. 5, the nut 16 abuts an external surface on both of the pipe connectors, including an external surface 12a on the female pipe connector 12 and an external surface 14a on the male pipe connector 14.

Figure 1:
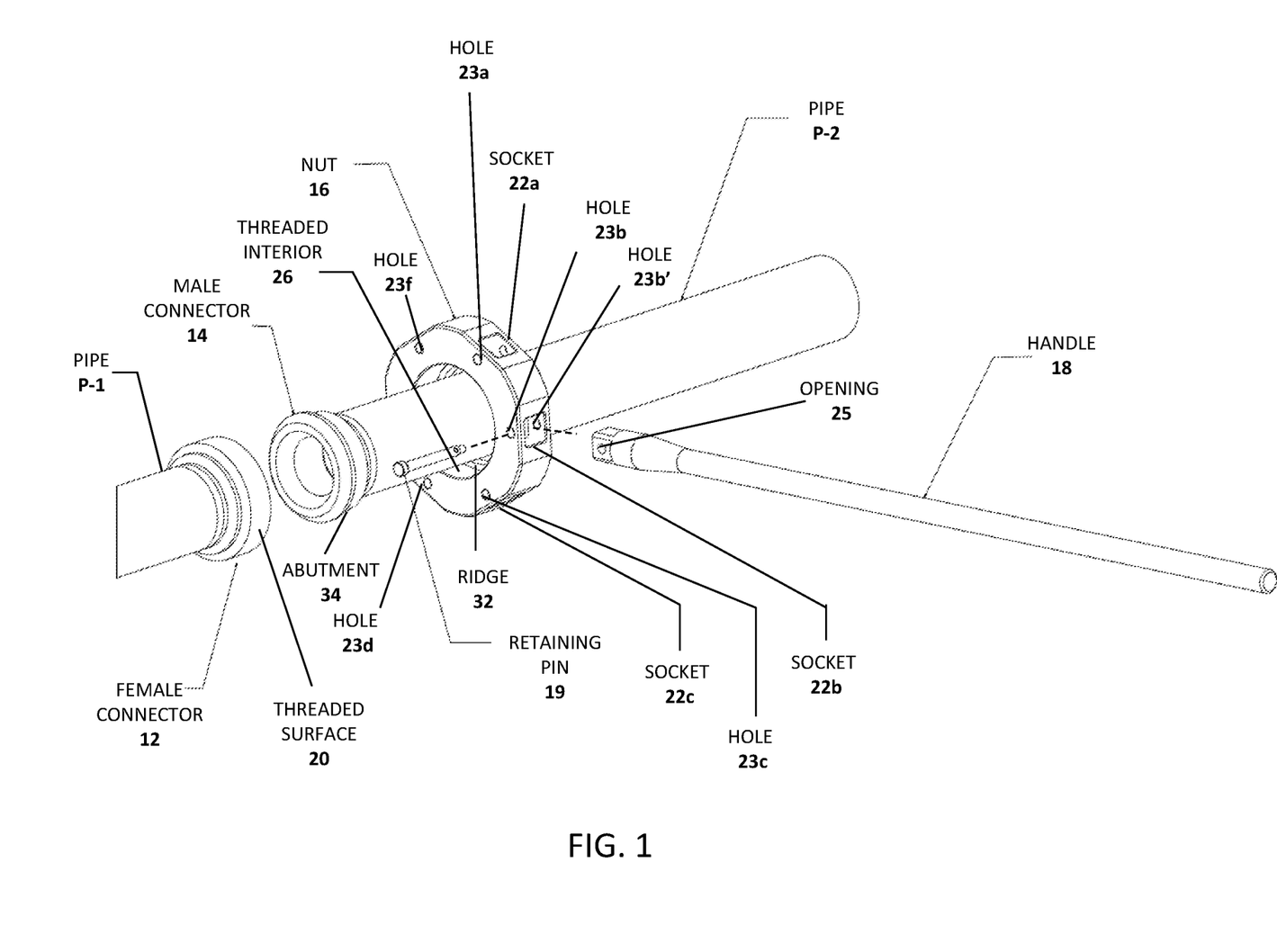
FIG. 1 is a perspective view of the separated parts of one embodiment of the hammerless union which includes a female connector 12, a male connector 14 (respectively welded to pipes P-1 and P-2), a nut 16, a handle 18 and a retaining pin 19 for holding the handle 18 in a socket 22b of the nut 16 as indicated by the partial exploded view.
Figure 2:
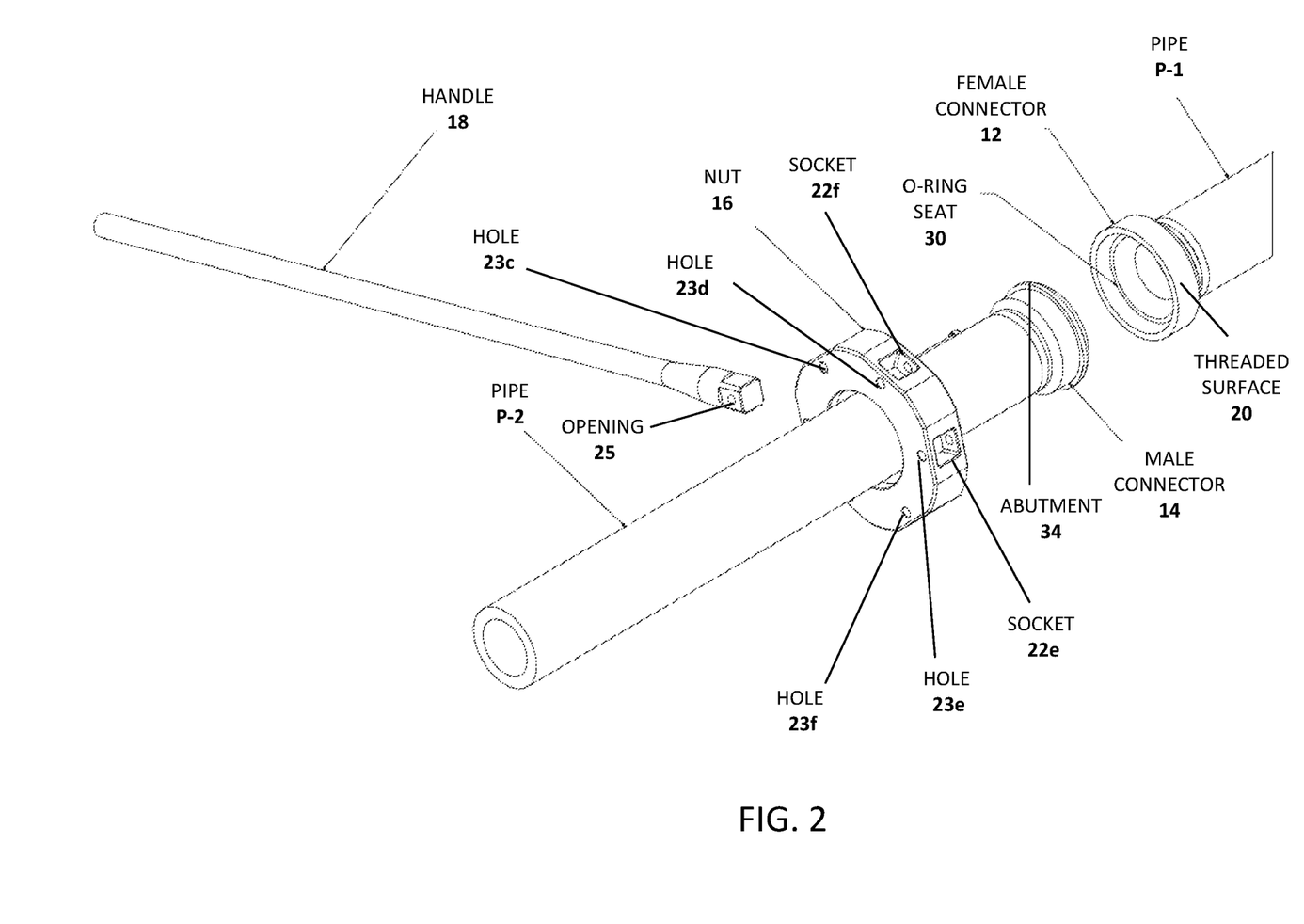
FIG. 2 is a perspective view of the same embodiment of FIG. 1 shown in a reversed orientation.

FIG. 2 is a perspective view of the same embodiment of FIG. 1 which is reversed relative to the perspective view of FIG. 1. It is seen in this perspective view (and in the cross section shown in FIG. 5) that the interior of the female connector 12 has a seat 30 for an o-ring to prevent leaks from the union device when it is installed to join the pipes P-1 and P-2.

Figure 4:
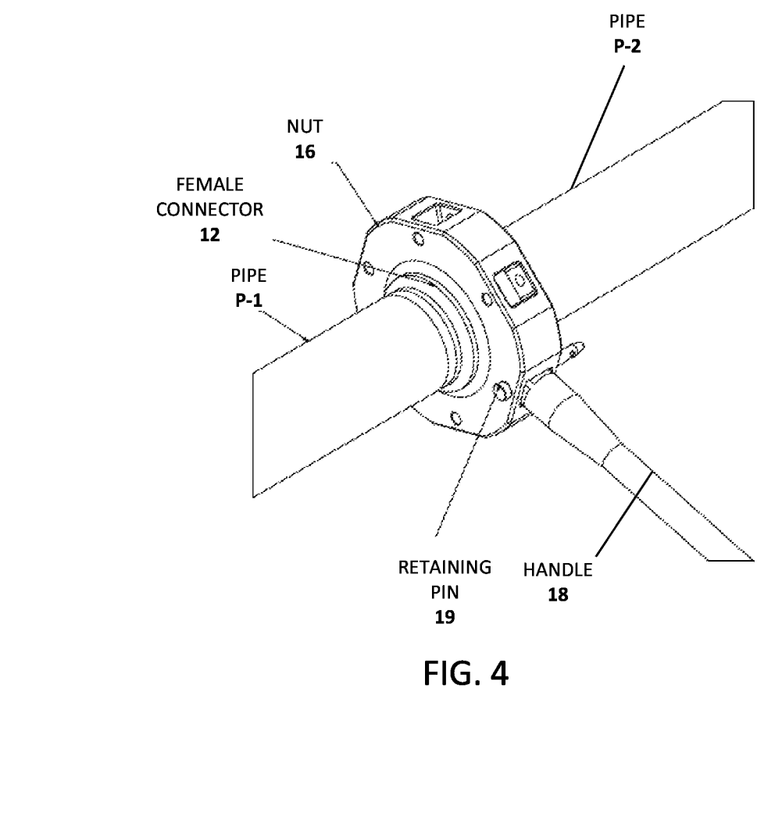
FIG. 4 is a perspective view of the same embodiment of FIGS. 1-3 in generally the same orientation as FIG. 1 with the hammerless union fastened in place to fasten the two pipes P-1 and P-2.
Figure 5:
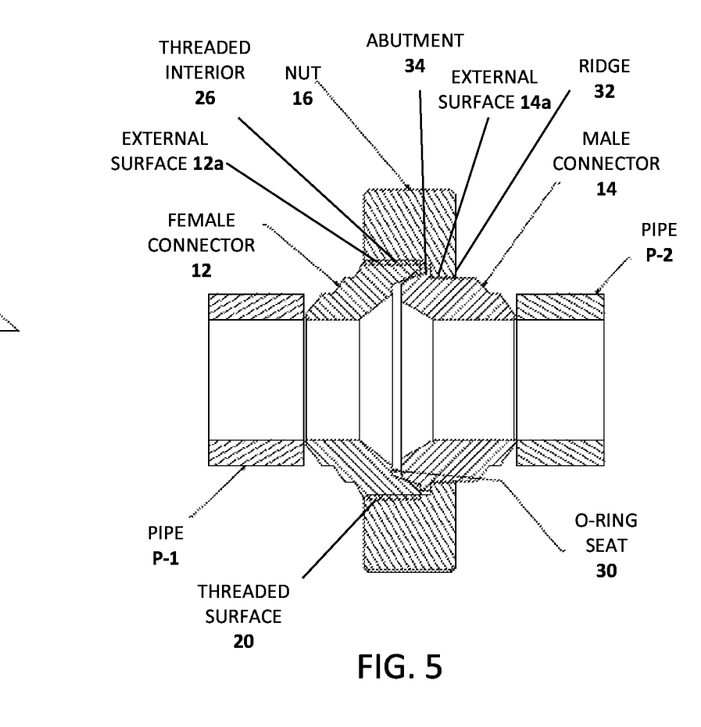
FIG. 5 is an arbitrary longitudinal cross section of FIG. 4 taken through the center of the union between any two of the six sockets 22a-f of the nut 16.

The nut 16 is provided with a plurality of handle connection structures, which in this particular example embodiment, are in the form of six equi-spaced square sockets 22a-f formed in the outer lateral side of the nut 16. These sockets 22a-f are dimensioned to accept the square end of a handle 18, the purpose of which is to provide leverage for torquing the nut 16 during tightening or loosening of the nut 16. It is advantageous to lock the handle 18 in place. In FIG. 4, the handle 18 is shown locked to socket 22b using a retaining pin 19 which is inserted into transverse holes 23b and 23b' formed in the nut 16 (shown in the partially exploded view of FIG. 1). The square end of the handle 18 has an opening 25 for accepting the retaining pin 19. Thus, to lock the handle 18 in place in socket 22b, the pin 19 is inserted into hole 23b and pushed to insert it through opening 25 in the handle 18 and then through hole 23b'. With the handle 18 locked in place on the nut 16, a user may confidently apply significant torque to the nut 16 during tightening or loosening of the nut 16.

As noted above, the nut 16 of this embodiment includes six sockets 22a-f. Each one of the sockets is provided with a similar handle locking arrangement described above and thus sockets 22a-f have adjacent holes 23a-f and 23a'-f' although not all of these are visible in the views of FIGS. 1-5. The purpose of providing the six sockets 22a-f is to allow a user to engage the handle 18 at a plurality of positions in order to avoid obstacles which may exist in the vicinity of the hammerless union device when it is being assembled or disassembled.

Figure 3:
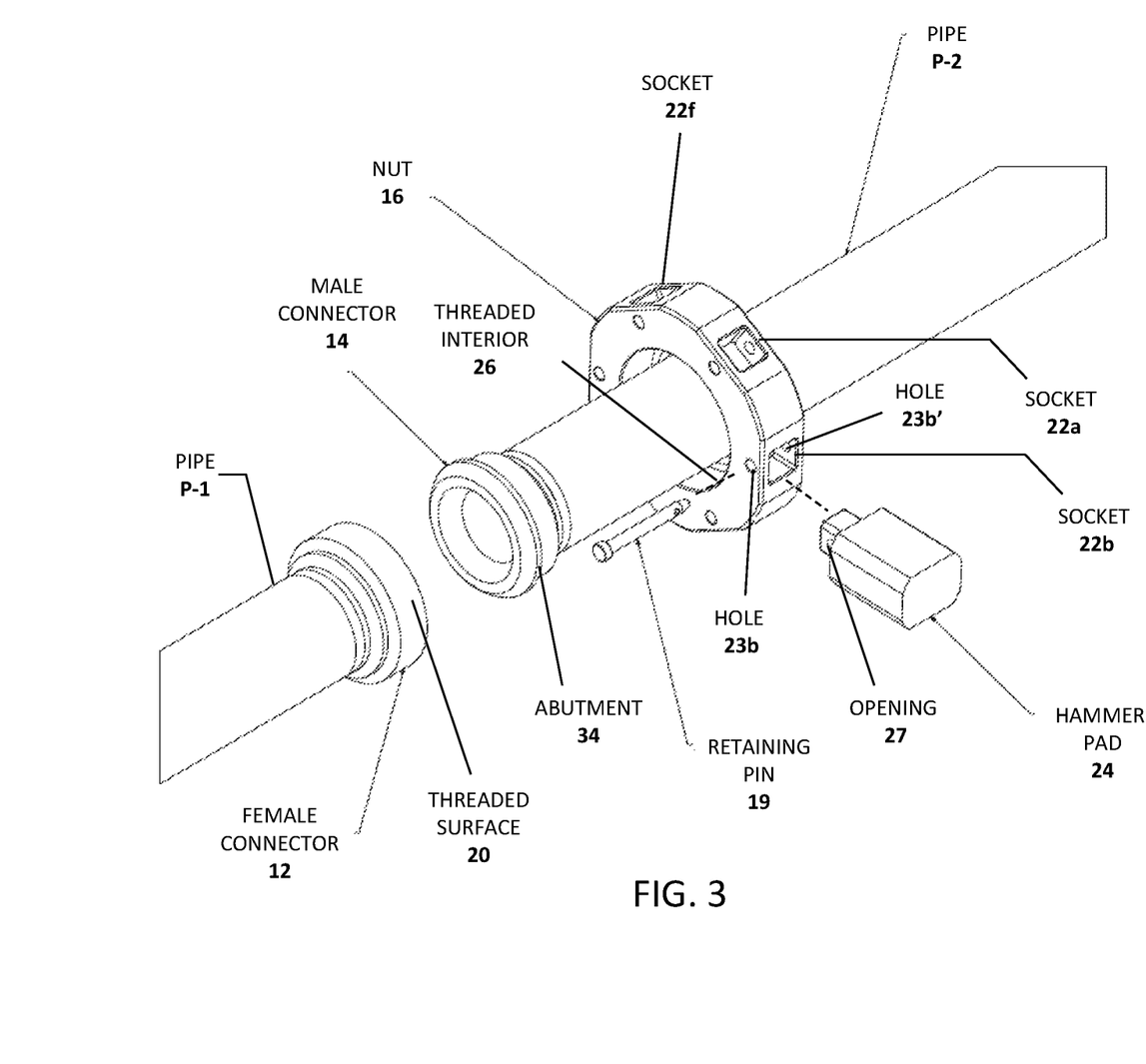
FIG. 3 is a perspective view of the same embodiment of FIGS. 1 and 2 in generally the same orientation of FIG. 1 showing a hammer pad 24 in place of the handle 18.

In certain situations, the union device may be found to have been tightened excessively or affected by other environmental factors to an extent that sufficient torque cannot be applied to the connected handle 18 to loosen the nut 16. The present embodiment provides an alternative mechanism for increasing torque on the nut 16 by providing a removable hammer pad 24. FIG. 3 illustrates connection of a hammer pad 24 to the nut 16 in an exploded perspective view. The hammer pad 24 is provided with a square end having an opening 27 for engagement of the retaining pin 19 in the same manner as described above for locking the handle 18. As described above for the handle 18, the hammer pad 24 may be engaged to the nut 16 at any one of the six sockets 22a-f in order to avoid obstacles in the vicinity of the union. In some embodiments, the hammer pad 24 is formed of a durable alloy such as brass or other similar alloy which does not generate sparks upon impact by a hammer.

Alternative Embodiments

It is to be understood that in alternative embodiments, the female connector 12 and the male connector 14 are replaceable with any other connector or adapter structures, provided that they are configured to join with each other to form at least a temporarily joined or coupled structure which may be rigidly fastened using an overlying structure exemplified by the nut 16 described herein. Although the male-female mating structures described herein as well as other possible male-female mating structures are advantageous for holding pipe ends together prior to fastening using a union structure, other connector structures are known to those with ordinary skill in the art and can be configured for fastening using a hammerless union nut as described hereinbelow.

Figure 6:
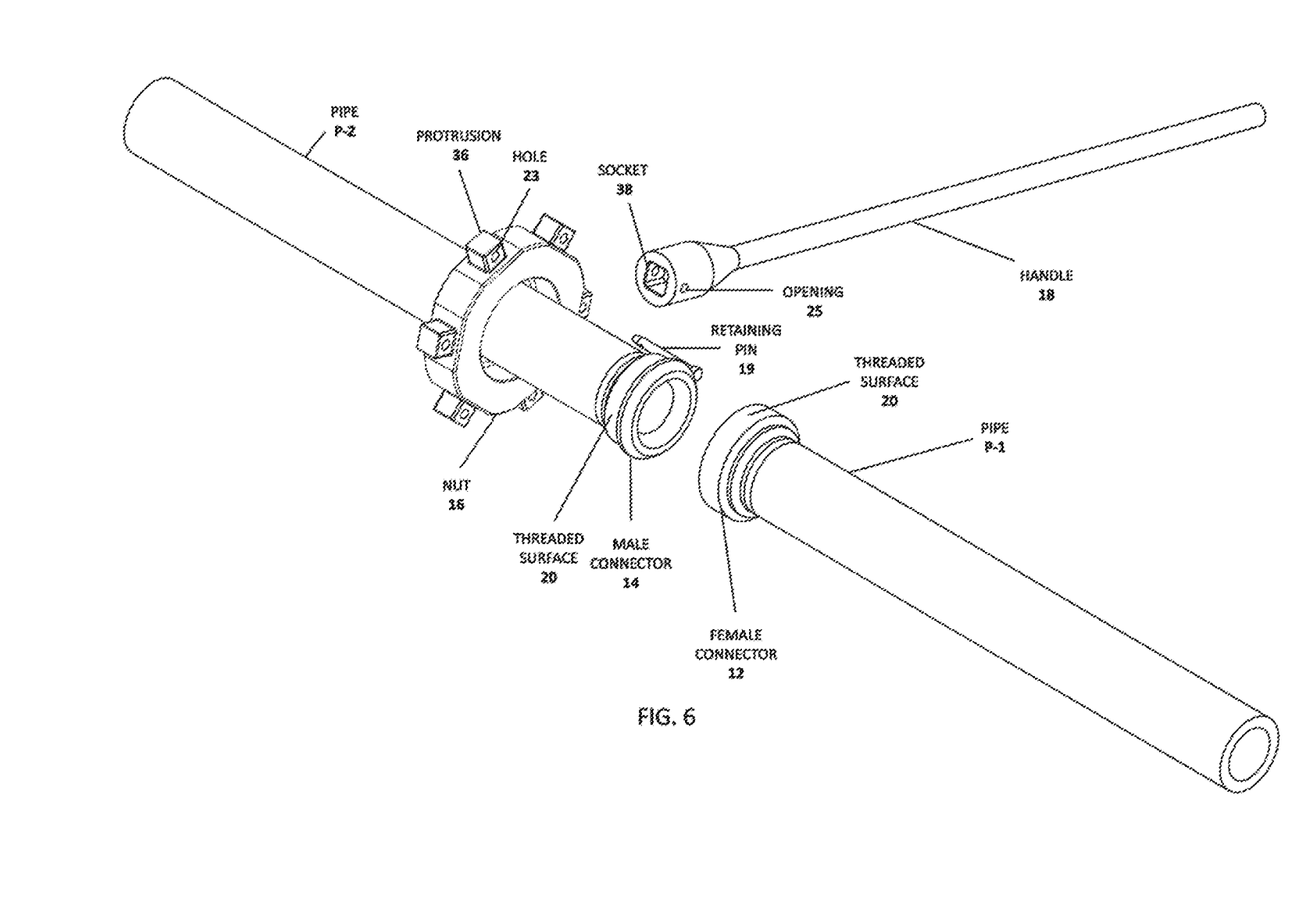
FIG. 6 is a perspective view of an embodiment of the hammerless pipe union wherein the nut 16 includes protrusions 36 configured to fit into a socket 38 formed on handle 18.

While the example embodiment described above uses nut sockets to receive a handle, the skilled person will recognize that a reversed arrangement is also possible, as shown in FIG. 6, wherein the nut 16 is provided with protrusions 36 configured to fit into a socket 38 formed on an alternative handle 18. This arrangement is also amenable to locking using a retaining pin 19 inserted into a hole 23 similar to the pin described above. This alternative embodiment is also within the scope of the invention.

While the example embodiment described above includes a threaded surface 20 on the female connector 12, outer threads 20 may be present on the outer surface of both of the two pipe connectors, as shown in FIG. 6.

While a retention pin mechanism has been described as a handle/hammer pad locking mechanism, the skilled person will recognize that alternative locking mechanisms are possible, such as a button detent mechanism for example. Such alternative locking mechanisms are considered equivalents of the mechanism shown in the example embodiment and can be arranged by the skilled person without undue experimentation in development of alternative embodiments which are also within the scope of the disclosure.

While the example embodiment described above has six equi-spaced handle connection structures in the form of square sockets 22a-f, it is to be understood that useful alternative embodiments may include fewer sockets, but it is advantageous to include at least two handle connection structures to allow a user to avoid obstacles in the vicinity of the union. Sockets and cooperating handle and/or hammer pad connection ends with different shapes are also within the scope of the disclosure.

EQUIVALENTS AND SCOPE

The terms "one," "a," or "an" as used herein are intended to include "at least one" or "one or more," unless otherwise indicated.

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this technology belongs.

While this technology has been particularly shown and described with references to embodiments thereof, it will be understood by those skilled in the art that various changes in form and details may be made therein without departing from the scope encompassed by the appended claims.

The invention claimed is:

1. A device for forming a union of pipe ends to allow flow of high-pressure fluid between the pipe ends, the device comprising:

two pipe connectors, each pipe connector having an annular body enclosing a bore and configured for attachment to an end of a length of pipe at one end and each configured for joining to the other of the two pipe connectors at the other end, wherein the pipe connector bores align with a throughbore in each pipe for allowing fluid flow between the pipes and pipe connectors when the union of pipe ends is formed with the device;

a nut having a bore with internal threads configured to mate with outer threads on an outer surface of one of the two pipe connectors, an outer lateral surface of the nut having a plurality of handle connection structures, wherein the nut directly abuts an external surface on one of the pipe connectors; and a handle for increasing the amount of manually-generated torque on the nut during tightening or loosening of the nut with respect to the outer threads, the handle having a nut attachment end configured to engage any one of the handle connection structures, the handle further provided with a mechanism for reversibly locking the handle to any one of the plurality of handle connection structures of the nut, wherein the mechanism for reversibly locking the handle to any one of the plurality of handle connection structures of the nut is provided by a retaining pin configured to pass through aligned openings in the nut and in the nut attachment end of the handle.

2. The device of claim 1 wherein the two pipe connectors are a female connector and a male connector.

3. The device of claim 2, wherein the outer threads are present only on the female connector, and the internal threads of the nut are configured to mate with the outer threads on the female connector, and the male connector outer surface includes an outer abutment which cooperates with a ridge on an interior surface of the bore of the nut to stop the threading of the internal threads onto the outer threads.

4. The device of claim 2, further comprising a hammer pad having a nut attachment end configured with a mechanism for connecting and reversibly locking the hammer pad to any one of the plurality of handle connection structures of the nut, the hammer pad provided to present a flat laterally extending surface for striking with a hammer to increase the amount of manually-generated torque on the nut during tightening or loosening of the nut with respect to the outer threads.

5. The device of claim 1, wherein the handle connection structures are defined as sockets formed in the outer lateral surface of the nut, the sockets configured to receive the nut attachment end of the handle.

6. The device of claim 5, wherein the sockets are square.

7. The device of claim 1, wherein the handle connection structures are defined as protrusions formed in or attached to the outer lateral surface of the nut, the protrusions configured to be received by sockets formed in the nut attachment end of the handle.

8. The device of claim 1 further comprising a hammer pad having a nut attachment end configured to engage any one of the plurality of handle connection structures of the nut, and a mechanism for reversibly locking the hammer pad to any one of the handle connection structures, the hammer pad having a flat laterally extending surface for striking with a hammer to increase the amount of manually-generated torque on the nut during tightening or loosening of the nut with respect to the outer threads.

9. The device of claim 8, wherein the mechanism for reversibly locking the hammer pad to any one of the plurality of handle connection structures of the nut is provided by the retaining pin configured to pass through aligned openings in the nut and in the nut attachment end of the hammer pad.

10. The device of claim 1, wherein the plurality of handle connection structures is six equi-spaced handle connection structures.

11. The device of claim 1, wherein one of the pipe connectors includes an outer abutment on the outer surface which cooperates with a ridge on an interior surface of the bore of the nut to stop the threading of the internal threads onto the outer threads.

12. The device of claim 11, wherein the handle connection structures are defined as sockets formed in the outer lateral surface of the nut, the sockets configured to receive the nut attachment end of the handle.

13. The device of claim 11, wherein the handle connection structures are defined as protrusions formed in or attached to the outer lateral surface of the nut, the protrusions configured to be received by sockets formed in the nut attachment end of the handle.

14. The device of claim 11, wherein the two pipe connectors are a female connector and a male connector, wherein the outer threads are on the outer surface of the female connector, and the outer abutment is on the outer surface of the male connector.

15. The device of claim 1, wherein at least one of the pipe connectors includes a seat for an o-ring to receive a seal for preventing leaking of fluid from the device when the union of pipe ends is formed with the device.

16. The device of claim 1, wherein the handle comprises a bar.

17. The device of claim 1, wherein each pipe connector is configured for attachment to the end of the length of pipe via welding or threading.

18. The device of claim 1, wherein mating of the nut with the outer threads on one of the pipe connectors is sufficient to fasten the pipe ends together without requiring further components.

19. The device of claim 1, wherein the outer lateral surface of the nut is polygonally-shaped.

20. A kit for forming a union of pipe ends to allow flow of high-pressure fluid between the pipe ends, the kit comprising:
two pipe connectors, each having an annular body enclosing a bore and configured for attachment to an end of a length of pipe at one end and each configured for joining to the other of the two pipe connectors at the other end, wherein the pipe connector bores align with a throughbore in each pipe for allowing fluid flow between the pipes and pipe connectors when the union of pipe ends is formed with the device;
a nut having a bore with internal threads configured to mate with outer threads on the outer surface of one of the two pipe connectors, an outer lateral surface of the nut having a plurality of handle connection structures, wherein the nut directly abuts an external surface on one of the pipe connectors;
a handle for increasing the amount of manually-generated torque on the nut during tightening or loosening of the nut with respect to the outer threads, the handle having a nut attachment end configured to engage any one of the handle connection structures, the handle further provided with a mechanism for reversibly locking the handle to any one of the plurality of handle connection structures of the nut, wherein the mechanism for reversibly locking the handle to any one of the plurality of handle connection structures of the nut is provided by a retaining pin configured to pass through aligned openings in the nut and in the nut attachment end of the handle; and
a hammer pad having a nut attachment end configured with a mechanism for connecting and reversibly locking the hammer pad to any one of the plurality of handle connection structures of the nut, the hammer pad provided to present a flat laterally extending surface for striking with a hammer to increase the amount of manually-generated torque on the nut during tightening or loosening of the nut with respect to the outer threads.

21. A device for forming a union of pipe ends to allow flow of high-pressure fluid between the pipe ends, the device comprising:
two pipe connectors, each pipe connector having an annular body enclosing a bore and configured for attachment to an end of a length of pipe at one end and each configured for mating with the other of the two pipe connectors at the other end to make a pipe connection wherein the pipe connector bores align with a throughbore in each pipe for allowing fluid flow between the pipes and pipe connectors when the union of pipe ends is formed with the device;

a nut configured to fix the pipe connection between the two pipe connectors, the nut having a bore with internal threads configured to mate with outer threads on an outer surface of one of the two pipe connectors, an outer lateral surface of the nut having a plurality of handle connection structures; and a handle for increasing the amount of manually-generated torque on the nut during tightening or loosening of the nut with respect to the outer threads, the handle having a nut attachment end configured to engage any one of the handle connection structures, the handle further provided with a mechanism for reversibly locking the handle to any one of the plurality of handle connection structures of the nut, wherein the mechanism for reversibly locking the handle to any one of the plurality of handle connection structures of the nut is provided by a retaining pin configured to pass through aligned openings in the nut and in the nut attachment end of the handle.

22. The device of claim 21, wherein one of the pipe connectors includes an outer abutment on the outer surface which cooperates with a ridge on an interior surface of the bore of the nut to stop the threading of the internal threads onto the outer threads.

23. The device of claim 21 further comprising a hammer pad having a nut attachment end configured to engage any one of the handle connection structures of the nut, and a mechanism for reversibly locking the hammer pad to any one of the handle connection structures, the hammer pad having a flat laterally extending surface for striking with a hammer to increase the amount of manually-generated torque on the nut during tightening or loosening of the nut with respect to the outer threads.

24. The device of claim 21, wherein mating of the nut with the outer threads on one of the pipe connectors is sufficient to fasten the pipe ends together without requiring further components.

* * * * *